United States Patent [19]

Carter et al.

[11] 3,780,276

[45] Dec. 18, 1973

[54] HYBRID REDUNDANCY INTERFACE

[75] Inventors: William C. Carter, Ridgefield, Conn.; Aspi B. Wadia, Shrub Oak, N.Y.

[73] Assignee: International Business Machines Corporation, Armonk, N.Y.

[22] Filed: June 20, 1972

[21] Appl. No.: 264,666

[52] U.S. Cl. .................. 235/153 AE, 340/146.1 BE

[51] Int. Cl. .................. G06f 11/00

[58] Field of Search .............. 235/153 AE, 153 AK; 340/146.1 BE, 172.5

[56] References Cited

UNITED STATES PATENTS

| | | | |
|---|---|---|---|
| 3,517,171 | 6/1970 | Avizienis | 235/153 AE |
| 3,654,603 | 4/1972 | Gunning et al. | 235/153 AE |
| 3,665,173 | 5/1972 | Bouricius et al. | 235/153 AE |

*Primary Examiner*—Charles E. Atkinson
*Attorney*—Isidore Match et al.

[57] ABSTRACT

The interface disclosed herein is capable of operating in the TMR/S (triple modular redundancy with sparing), the comparison, and the simplex modes. The interface controls the interconnection between $m_1, \ldots, m_n$ identical sending modules and $M_1, \ldots, M_n$ identical receiving modules. To this end, there are provided $1, \ldots, n$ control registers which comprise $1, \ldots, n$ bits and an $(n+1)^{th}$ control register which comprises a single bit $R_S$. The register bits are employed to provide $n^2$ forcing functions for the outputs $d_1, \ldots, d_n$ of the sending modules which are represented by the following logical equation:

$$f_{ji} = d_j R_{ij} V \overline{R}_{ij} \overline{R}_{i|j+1|_n} \cdots \overline{R}_{i|j+n-2|_n}$$

wherein $j$ is the bit number, $1, \ldots, n$, $i$ is the register number $1, \ldots, n$, the symbol $|\ |_n$ signifies modulo $n$ and V represents the OR function. The $n^2$ forcing functions are respectively applied in sets of $n$ viz., $f_1 i$, $f_2 i$, $\ldots, f_n i$ $i = 1, 2, \ldots, n$ to $(1, \ldots, n)^{th}$ threshold function circuits, each of the latter circuits producing a "1" output when $\geq 2$ of the inputs thereto are "1", the outputs of the $(1, \ldots, n)^{th}$ threshold function circuits being applied to the $M_1, \ldots, M_n)^{th}$ receiving modules, respectively. From the register settings and the sending module outputs, there are generated pairs represented by the logical equation $$C_{ij} = (d_i\ V\ \overline{R}_{ij}\ V\ \overline{R}_{ji}\ V\ R_S,\ d_j R_{ij} R_{ji}\ V\ R_s) \text{ for } j = i+1 \quad (i=1, 3, 5, \ldots, n-1)$$

$$C_{ij} = (d_i\ V\ R_{ij}\ V\ R_{ji},\ d_j R_{ij} R_{ji}) \text{ for } j \neq i+i$$

wherein the $ij$ pair in the first equation can take the values of 13, 14, . . ., $1n$, 24, . . ., $2n$, . . ., $(n-2)n$. From the pairs, $(ij)$, there are generated register triggers having the following equations:

$$A_1 = \oplus/C_{12}\ \Lambda_M\ C_{13}\ \Lambda_M\ C_{14} \Lambda_M \cdots \Lambda_M\ C_{1n}$$
$$A_2 = \oplus/C_{21}\ \Lambda_M\ C_{23} \Lambda_M\ C_{24} \Lambda_M \cdots \Lambda_M\ C_{2n}$$
$$\vdots$$
$$A_n = \oplus/C_{1n} \Lambda_M\ C_{2n} \Lambda_M\ C_{3n} \Lambda_M \cdots \Lambda_M\ C_{(n-1)n}$$

wherein the symbol $\Lambda_M$ represents the morphic AND function called the RCCO in U.S. Pat. No. 3,559,167, the symbol $\oplus$ signifies the exclusive OR function on the pair of lines that are outputs of the morphic AND. The $(A_1, \ldots, A_n)^{th}$ triggers are applied to the $(1, \ldots, n)^{th}$ bits of the registers respectively, to switch the bits to the opposites of their initial binary states whereby, upon the generation of a register trigger $A_j$ and the consequent switching of register bits $R_{1j}, \ldots, R_{nj}$ to their opposite binary states, sending module $m_j$ is disconnected from operation.

To operate the interface in the TMR/S mode, initially all of the bits of the $(1, \ldots, n)^{th}$ registers are initially set to the 1 state and the bit of the $(n+1)^{th}$ register is set to the 0 state. To operate the interface in the comparison mode, all the bits bearing the same numerical designation as the sending module which are to be compared in the registers bearing the same numerical designations as the sending modules which are to be compared are initially set to the 1 state with all of the other bits set to the 0 state. To operate in the simplex mode, all of the bits in the $(1, \ldots, n)^{th}$ registers except those bearing the same numerical designation as that borne by the register in which they are contained are set to the 0 state, the excepted bits being set to the 1 state. Also, in the simplex mode of operation, the bit of the $n+1^{th}$ register is set to the 1 state.

7 Claims, 7 Drawing Figures

HYBRID REDUNDANCY INTERFACE

BACKGROUND OF THE INVENTION

This invention relates to high reliability computer systems. More particularly, it relates to a novel hybrid redundancy interface for such system.

A known technique for achieving high reliability in a computer system is to partition the system into serially connected modules, replace each of the modules by a set of $n$ identical copies, and then provide means for interconnecting these sets of copies whereby the system operates in the TMR/S (triple modular redundancy-with-sparing) mode. In this technique, there are generally employed three identical input buses to fan out to all of the $n$ copies of a module. In this type of arrangement, only three modules (desirably, the correctly operating ones), are connected to three output buses.

The known technique described hereinabove and the organization for its implementation is deficient in that a single bus failure cripples the total system.

Accordingly, it is an important object of this invention to provide a system wherein a bus failure does not deleteriously affect operation.

It is another object to provide a simple interface which controls the interconnections between $n$ identical copies of one module with $n$ identical copies of another module, both of which appear as serially connected in the operation of a simplex system.

It is a further object to provide an interface as set forth in the preceding object which provides interconnection for the interface to operate in the TMR/S, comparison and simplex modes.

It is still another object to provide an interface wherein every failure in the interface appears either as a failure of one of the modules it feeds into and wherein the effect of the failure is masked by the switching of the same module or the automatic correction of the failure.

SUMMARY OF THE INVENTION

In accordance with the invention, there is provided an interface for controlling the interconnections between $m_1, \ldots, m_n$ identical sending modules and $M_1, \ldots, M_n$ identical receiving modules. The invention comprises $1, \ldots, n$ control registers, each of these registers comprising $n$ bits and an $(n+1)^{th}$ control register comprising a single bit $R_S$. Means are included for setting the bits of the registers to chosen initial states to enable the interface to operate in the TMR/S (triple modular redundancy with sparing), comparison and simplex modes of operation. The sending modules provide $d_1, \ldots, d_n$ outputs respectively. In response to the latter outputs, means are included for providing $n^2$ forcing functions, each of the forcing functions being a circuit represented by the logical equation $$f_{ji} = d_j R_{ij} V \overline{R}_{ij} \overline{R}_{i|j+1|_n} \cdots \overline{R}_{i|j+n-2|_n}$$

wherein $j$ is the bit number of a bit and $i$ is the register number both of which take the value of $1, \ldots, n$, the symbol $|\ |_n$ signifies modulo $n$ and the symbol V represents the OR function. There are also provided $1, \ldots, n$ threshold function circuits which respectively produce a binary "1" output when $\geq 2$ inputs thereto are binary "1"'s. The outputs of the sets of $n$ forcing functions $f_1i, f_2i, \ldots, f_ni$ $i = 1, \ldots, n$ are applied to the $(1, \ldots, n)^{th}$ threshold circuits, respectively. The outputs of the $(1, \ldots, n)^{th}$ threshold circuits are applied to $(M_1, \ldots, M_n)^{th}$ receiving modules respectively. There are also included means for generating pairs which are represented by the following logical equation:

$$C_{ij} = (d_i V \overline{R}_{ij} V \overline{R}_{ij} V R_S, d_j R_{ij} R_{ji} V R_S)$$

wherein $j = i+1$ and $i$ takes on the value $1, 3, 5, \ldots, n-1$ and $$C_{ij} = (d_i V \overline{R}_{ij} V \overline{R}_{ji}, d_j R_{ij} R_{ji})$$

wherein $C_{ij}$ is the self-testing pair and the $ij$ pair takes one of the values of $13, 14, \ldots, 1n, 24, \ldots, 2n, \ldots, (n-2)n$. Means are provided for generating register triggers utilizing the above-mentioned self-testing pairs, the triggers being represented by the following equations:

$$A_1 = \oplus / C_{12} \Lambda_M C_{13} \Lambda_M C_{14} \Lambda_M \ldots \Lambda_M C_{1n}$$
$$A_2 = \oplus / C_{21} \Lambda_M C_{23} \Lambda_M C_{24} \Lambda_M \ldots \Lambda_M C_{2n}$$
$$\vdots$$
$$A_n = \oplus / C_{1n} \Lambda_M C_{2n} \Lambda_M C_{3n} \Lambda_M \ldots \Lambda_M C_{(n-1)n}$$

wherein the symbol $\oplus$ signifies the exclusive OR function, the symbol $\Lambda_M$ represents the morphic AND function and $A_1, \ldots, A_n$ are the register triggers. Means are included for applying the $(A_1, \ldots, A_n)^{th}$ triggers to the $(1, \ldots, n)^{th}$ bits of the $(1, \ldots, n)^{th}$ registers respectively to switch the bits to the opposites of their initial binary states whereby, upon the generation of a register trigger $A_j$ and the consequent switching of register bits $R_{1j}, \ldots, R_{nj}$ to the opposite binary states, sending module $m_j$ is disconnected.

The inventive interface is capable of operating in the TMR/S (triple modular redundancy with sparing), the comparison, and simplex modes. In the TMR/S mode, the bits of registers $1, \ldots, n$ are initially set to the 1 binary state and the bit of the $(n+1)^{th}$ register is set to the 0 binary state. In the comparison mode, all of the bits in the registers are initially set to the 0 binary state except the bits having the same numerical designations as the numerical designations of the sending modules to be compared in the registers having the latter sending module designations, these bits being set to the 1 state. In the simplex mode, the bit in the $(n+1)^{th}$ register is set to the 1 binary state. All of the bits in the $(1, \ldots, n)^{th}$ registers are set to the 0 state, except that bit in a register bearing the same numerical designation as the register designation. In the simplex mode of operation, sending modules $m_1, \ldots, m_n$ are respectively connected through the interface to receiving modules $M_1, \ldots, M_n$.

The foregoing and other objects, features and advantages of the invention will be apparent from the following more particular description of preferred embodiment of the invention, as illustrated in the accompanying drawings.

DESCRIPTION OF A PREFERRED EMBODIMENT

In the invention described hereinbelow, there is provided an interface between two sets of modules, viz., $\{m_1, m_2, \ldots, m_n\}$ and $\{M_1, M_2, \ldots, M_n\}$ wherein $m_i$ and $M_i$, wherein $i = 1, \ldots, n$, are identical replicas of $m$ and M respectively. The interface provides interconnection between the two sets of identical replicas whereby a system can function in the following three modes:

MODE 1 — TMR/S (Triple Modular Redundancy With Sparing)

In this case, the system has to operate in the TMR mode. Upon the detection of a module failure, the failed module has to be switched off and one of its spare copies switched in. The switching off and switching in continues until the occurrence of $(n-2)^{th}$ module failure within a set of $n$ identical copies at which stage, automatic switching into the comparison mode has to occur. The next failure exhausts all correction and detection capability and operation in this mode ceases. Operation, unchecked, can be continued subject to external state setting determined by software.

MODE 2 — Comparison

In this mode, the system starts off with modules $m_1$ and $m_2$, respectively, connected to modules $M_1$ and $M_2$ handling one process, modules $m_3$ and $m_4$ connected to modules $M_3$ and $M_4$ handling another process, etc., whereby the system handles $[n/2]$ processes in parallel, each process being in a duplication and comparison mode. Upon the detection of a failure, the process in which the failure occurred reverts to diagnostic procedures. The mode ends when the last process is in a diagnostic procedure because of an $[n/2^{th}]$ solid failure.

MODE 3 — Parallel Processing

In this mode, the system operates with module $m_1$ connected to module $M_i$ wherein $i = 1, \ldots, n$. Consequently, there is enabled the running of $n$ processes in parallel.

MODE 4 — Simplex Mode

The interface also provides connections for the $n$ copies of a simplex module whereby operation of the system can continue until all $n$ of one set of modules have failed using software error detection, diagnosis and status setting.

MODE 5 — Mixed Mode

Any combination of the TMR/S, TMR and comparison modes may be run, subject to the limitations of the number of modules. For example, with 6 modules, a possible set of combinations is 1 TMR/S (4 modules), and 1 comparison (2 modules). Clearly, other combinations are possible and obvious.

Figure 1:
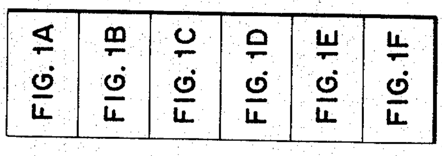
FIGS. 1A to 1F, taken together as in FIG. 1 constitute a depiction of a preferred embodiment constructed in accordance with the principles of the invention.
Figure 1A:
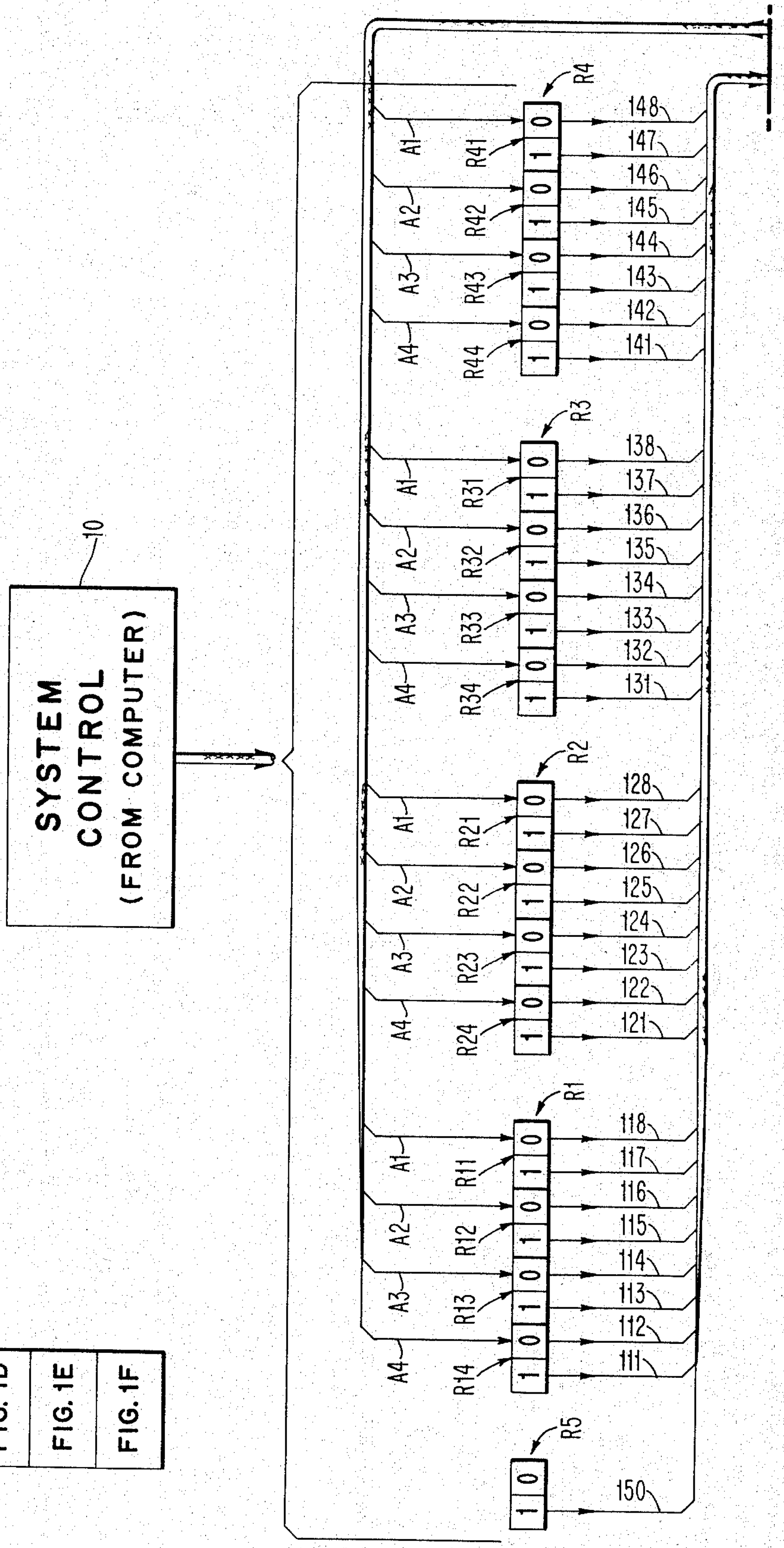
Figure 1B:
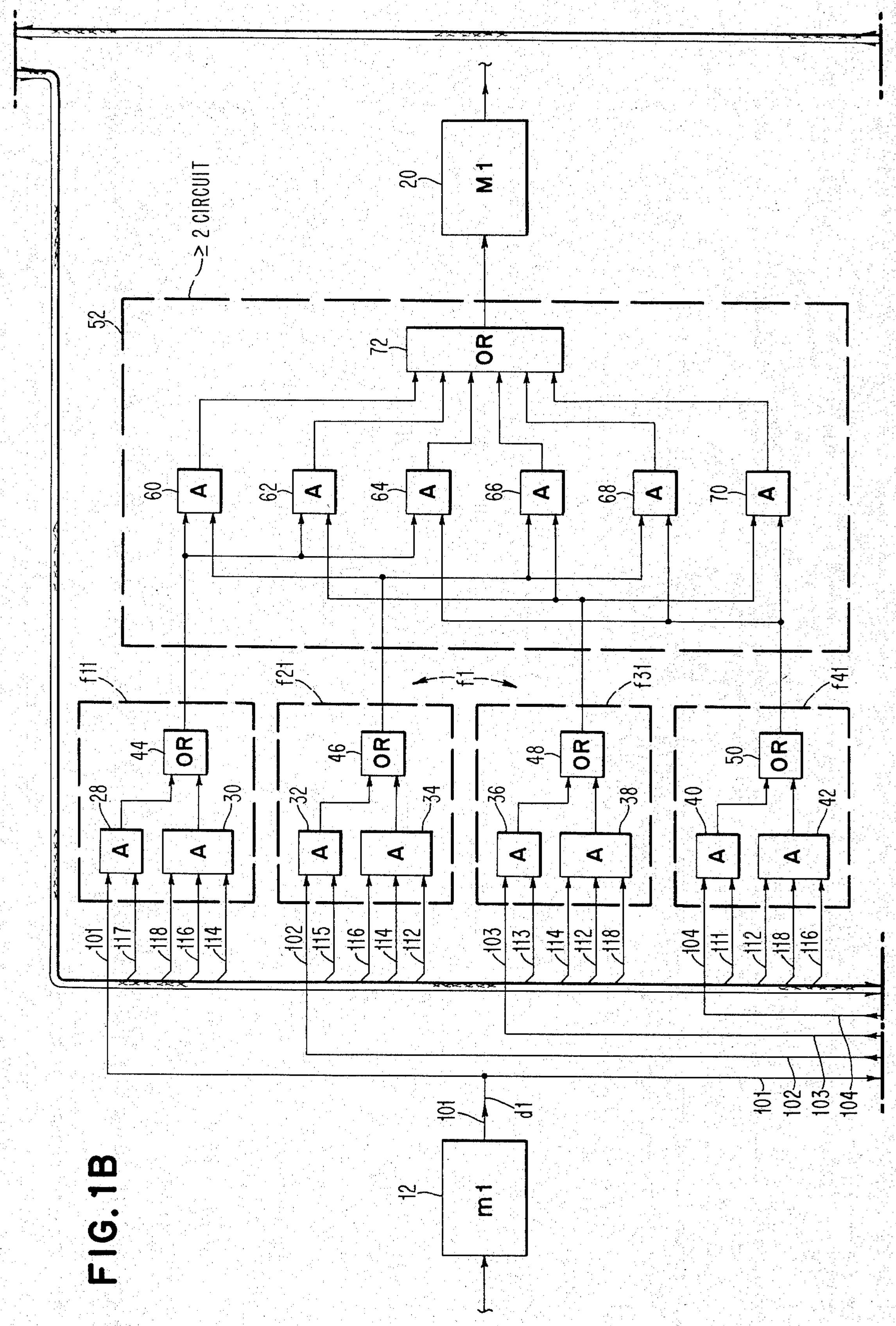
Figure 1C:
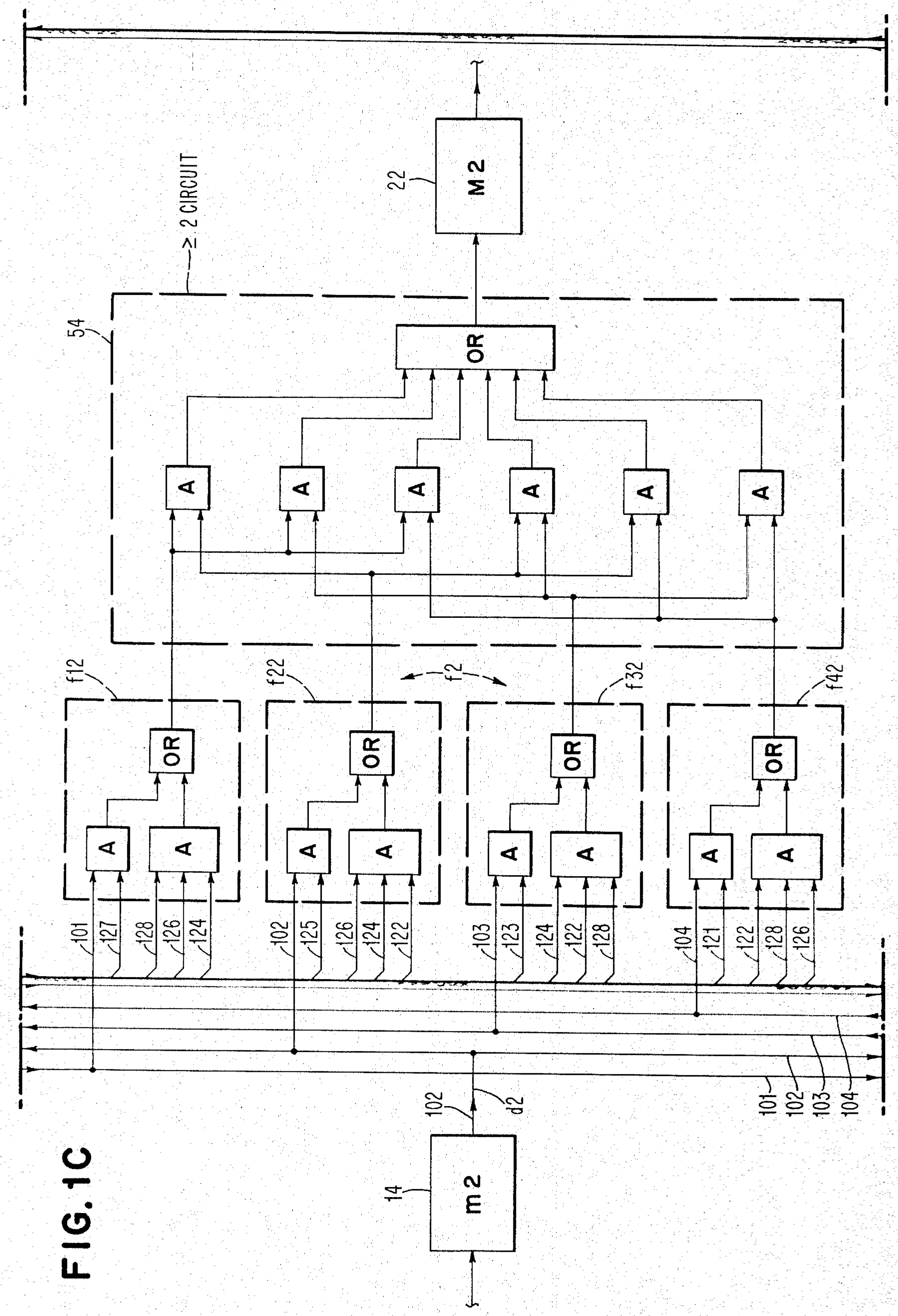
Figure 1D:
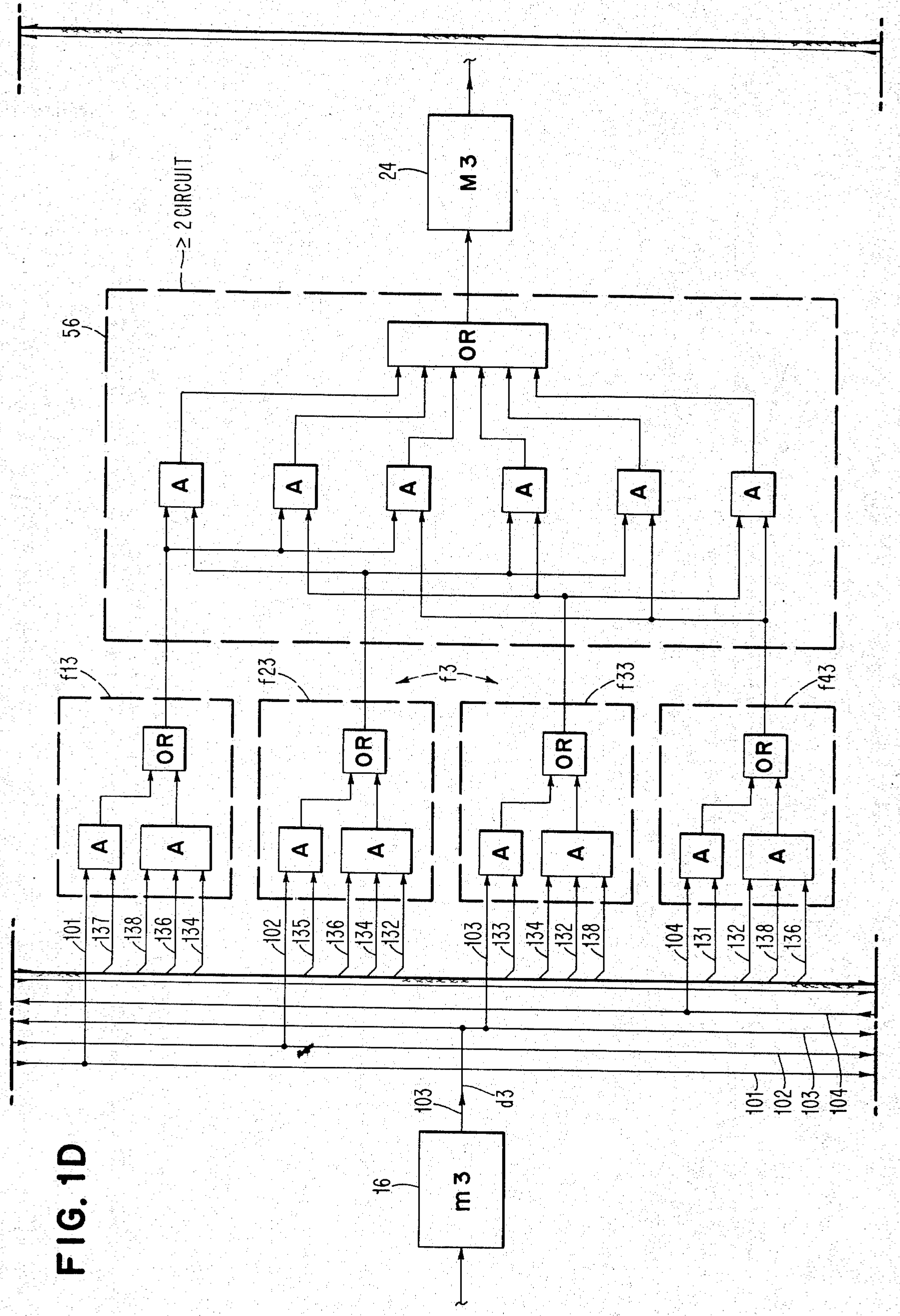
Figure 1E:
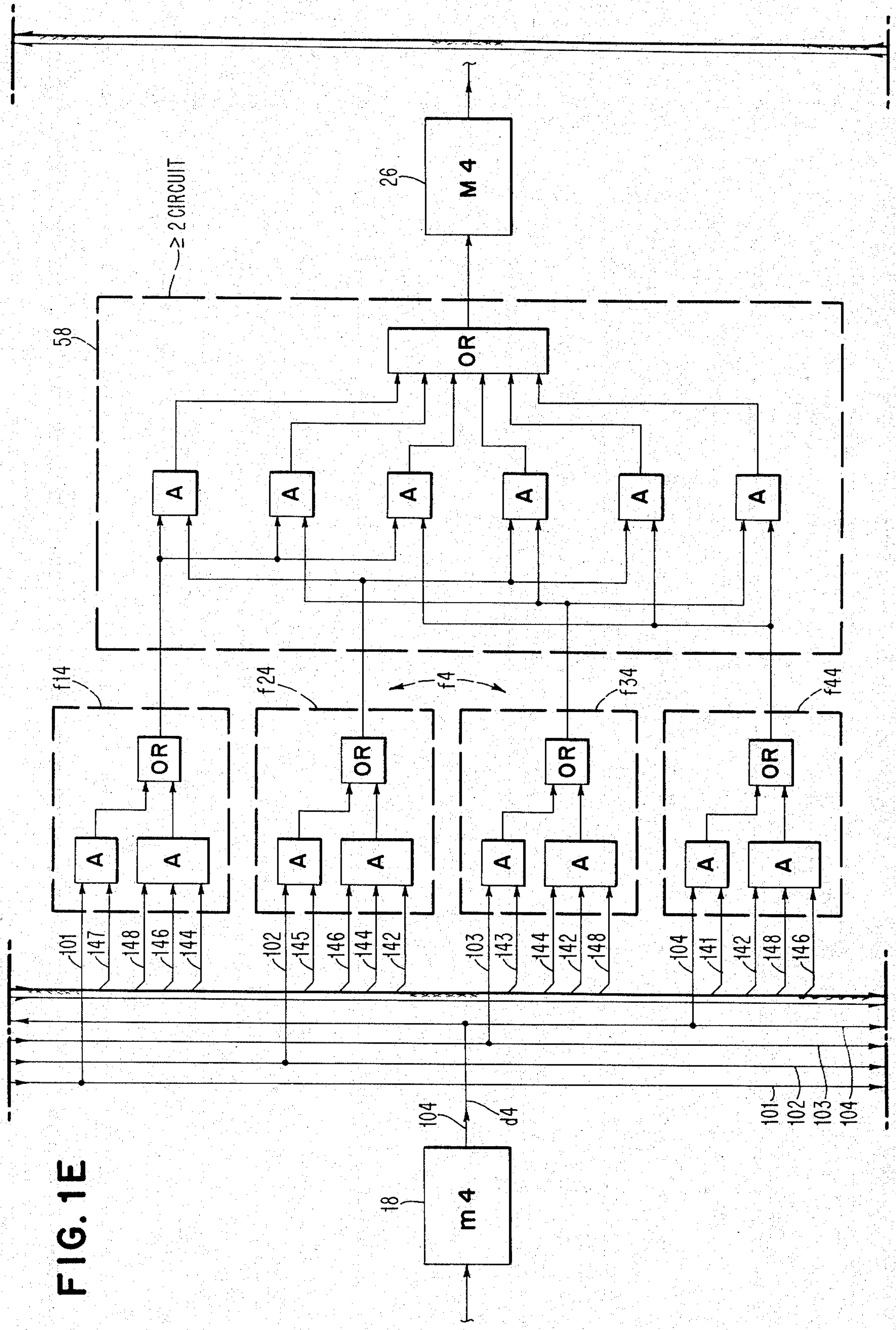
Figure 1F:
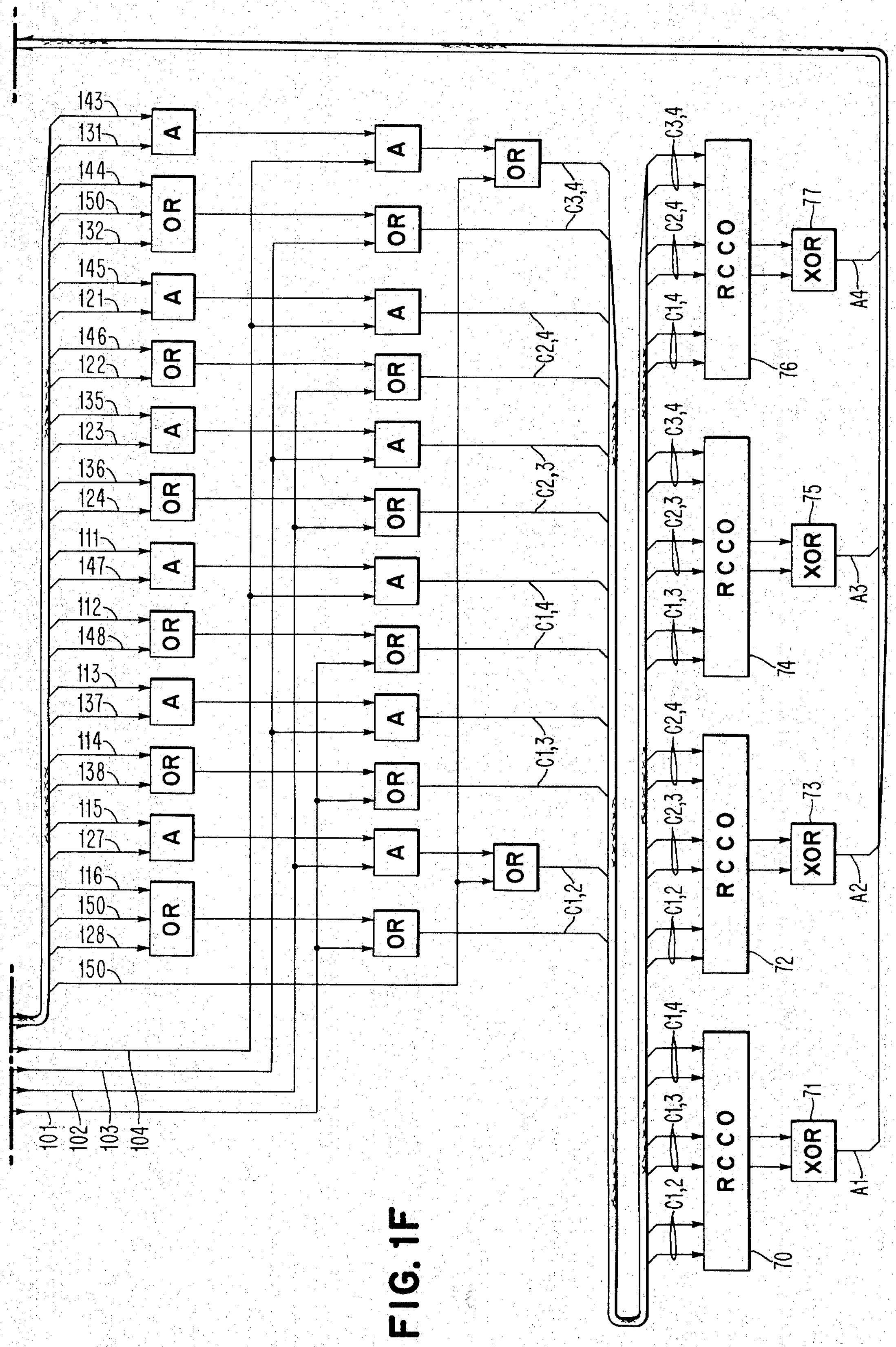

Reference is now made to FIGS. 1A to 1F taken together as in FIG. 1 which constitute a depiction of a preferred embodiment of the interface constructed according to the invention. In these FIGS., there is shown the examples wherein there are utilized four sending modules $m_1 \ldots m_4$ and four receiving modules $M_1, \ldots, M_4$. The interface is controlled by the contents of four registers $R_1$, $R_2$, $R_3$, and $R_4$. Each of these registers has a length of 4 bits. In addition, there is shown a 1 bit register $R_5$, the operation of which will be further detailed hereinbelow. Initiation of the operation of the interface in a particular mode is effected by the system control stage 10 which effects the initial settings of the registers, such system control stage suitably being a component of a computer and which may be programmed for its setting function. Thereafter, if the system is operating in the TMR/S or Comparison mode, automatic required switching is achieved. In the further description of FIGS. 1A–1F, the modules $m_1 - m_4$, numerically designated by the numbers 12, 14, 16, and 18, are termed sending modules and the modules $M_1 - M_4$, designated by the numerals 20, 22, 24 and 26, are suitably termed receiving modules.

In the operation of the interface, each receiving module $M_i$ wherein $i - 1$–4, receives as input the result of a threshold voting on the output of all of the sending modules $m_1 - m_4$. The input to each threshold voter is controlled by the forcing and gating function $f_{ij}$. In the FIGS., there are shown four forcing functions groups $f_1$ to $f_4$.

Considering the operation of forcing function $F_1$, it is seen that there are provided therefor, the AND circuits 28, 30, 32, 34, 36, 38, 40 and 42, and the OR circuits 44, 46, 48 and 50. The inputs to AND circuit 28 are the output line 101, i.e., output $d_1$ of sending module $m_1$ and the set output line 117 of flip-flop $R_{11}$ of register $R_1$. The inputs to AND circuit 30 are the reset output line 118 of flip-flop $R_{11}$, the reset output line 116 of flip-flop $R_{12}$ of register $R_1$ and the reset output line 114 of flip-flop of $R_{13}$ of register $R_1$. The output lines of AND circuits 28 and 30 are applied to an OR circuit 44. Similarly, to AND circuit 32, there is applied the line 102, i.e., output $d_1$ from sending module $m_2$. To AND circuit 36 there is applied the line 103, i.e., output $d_3$ from sending module $m_3$ and to AND circuit 40, there is applied the line 104, i.e., output $d_4$ from sending module $m_4$. The remaining inputs to AND circuits 32, 34, 36, 38, 40 and 42 are the particular flip-flop output lines as shown in FIGS. The outputs of AND circuits 32 and 34 are applied to the OR circuit 46. The outputs of AND circuits 36 and 38 are applied to the OR circuit 48 and the outputs of AND circuits 40 and 42 are applied to the OR circuit 50. The bits in each of registers $R_1 - R_4$ and the equations of the forcing functions $f_1$–$f_4$ are as set forth immediately hereinbelow.

Four 4-bit registers $R_{14}\, R_{13}\, R_{12}\, R_{11}$ = Register $R_1$
$R_{24}\, R_{23}\, R_{22}\, R_{21}$ = Register $R_2$
$R_{34}\, R_{33}\, R_{32}\, R_{31}$ = Register $R_3$
$R_{44}\, R_{43}\, R_{42}\, R_{41}$ = Register $R_4$ Equation of Forcing Functions $f_1$ $$f_{11} = d_1R_{11} \vee \overline{R}_{11}\overline{R}_{12}\overline{R}_{13}$$
$$f_{21} = d_2R_{12} \vee \overline{R}_{12}\overline{R}_{13}\overline{R}_{14}$$
$$f_{31} = d_3R_{13} \vee \overline{R}_{13}\overline{R}_{14}\overline{R}_{11}$$
$$f_{41} = d_4R_{14} \vee \overline{R}_{14}\overline{R}_{11}\overline{R}_{12}$$

$f_2$ $$f_{12} = d_1R_{21} \vee \overline{R}_{21}\overline{R}_{22}\overline{R}_{23}$$
$$f_{22} = d_2R_{22} \vee \overline{R}_{22}\overline{R}_{23}\overline{R}_{24}$$
$$f_{32} = d_3R_{23} \vee \overline{R}_{23}\overline{R}_{24}\overline{R}_{21}$$
$$f_{42} = d_4R_{24} \vee \overline{R}_{24}\overline{R}_{21}\overline{R}_{22}$$

$f_3$ $$f_{13} = d_1R_{31} \vee \overline{R}_{31}\overline{R}_{32}\overline{R}_{33}$$
$$f_{23} = d_2R_{32} \vee \overline{R}_{32}\overline{R}_{33}\overline{R}_{34}$$
$$f_{33} = d_3R_{33} \vee \overline{R}_{33}\overline{R}_{34}\overline{R}_{31}$$
$$f_{43} = d_4R_{34} \vee \overline{R}_{34}\overline{R}_{31}\overline{R}_{32}$$

$f_4$ $$f_{14} = d_1R_{41} \vee \overline{R}_{41}\overline{R}_{42}\overline{R}_{43}$$
$$f_{24} = d_2R_{42} \vee \overline{R}_{42}\overline{R}_{43}\overline{R}_{44}$$
$$f_{34} = d_3R_{43} \vee \overline{R}_{43}\overline{R}_{44}\overline{R}_{41}$$

$f_{44} = d_4R_{44}\ V\ \overline{R_{44}}\overline{R_{41}}\overline{R_{42}}$ wherein the symbol V represents the OR function.

There are provided four voting circuits 52, 54, 56 and 58 whose inputs are controlled by their associated forcing functions, each of these circuits being a $\geq 2$ circuit threshold function which is a circuit which produces a binary "1" output if >2 of its inputs are a binary "1". Thus, for example, threshold voting circuit 52 comprises the AND circuits 60, 62, 64, 66, 68 and 70, the outputs of the latter AND circuits being applied to an OR circuit 72, the output of OR circuit 72 being applied to receiving module $M_1$.

The logical equations for the threshold voting circuits 52, 54, 56, and 58 are as follows:

Threshold Circuit 52

$$f_{11}f_{21}\ V\ f_{11}f_{31}\ V\ f_{11}f_{41}\ V\ f_{21}f_{31}\ V\ f_{21}f_{41}\ V\ f_{31}f_{41}$$

Threshold Circuit 54

$$f_{12}f_{22}\ V\ f_{12}f_{32}\ V\ f_{12}f_{42}\ V\ f_{22}f_{32}\ V\ f_{22}f_{42}\ V\ f_{32}f_{42}$$

Threshold Circuit 56

$$f_{13}f_{23}\ V\ f_{13}f_{33}\ V\ f_{13}f_{43}\ V\ f_{23}f_{33}\ V\ f_{23}f_{43}\ V\ f_{33}f_{43}$$

Threshold Circuit 58

$$f_{14}f_{24}\ V\ f_{14}f_{34}\ V\ f_{14}f_{44}\ V\ f_{24}f_{34}\ V\ f_{24}f_{44}\ V\ f_{34}f_{44}$$

The outputs of threshold voting circuits 54, 56 and 58 are applied to receiving modules $M_2$, $M_3$ and $M_4$, respectively.

It is noted that the various output lines of the flip-flop of registers $R_1 - R_5$ and lines 101, 102, 103, and 104, i.e., outputs $d_1, d_2, d_3$ and $d_4$ are applied to AND and OR circuits in various combinations to generate the output pairs $C_{12}$, $C_{13}$, $C_{14}$, $C_{23}$, $C_{24}$, and $C_{34}$. The equations for generating the latter outputs are as follows:

$C_{12} = (d_1\ V\ \overline{R}_{12}\ V\ \overline{R}_{21}\ V\ R\ ,\ d_2R_{12}R_{21}\ V\ R)$ $C_{13} = (d_1\ V\ \overline{R}_{13}\ V\ \overline{R}_{31},\ d_3R_{13}R_{31})$ $C_{14} = (d_1\ V\ \overline{R}_{14}\ V\ \overline{R}_{41},\ d_4R_{14}R_{41})$ $C_{32} = (d_2\ V\ \overline{R}_{23}\ V\ \overline{R}_{32},\ d_3R_{23}R_{32})$ $C_{24} = (d_2\ V\ \overline{R}_{24}\ V\ \overline{R}_{42},\ d_4R_{24}R_{42})$ $C_{34} = (d_3\ V\ \overline{R}_{34}\ V\ \overline{R}_{43}\ V\ R,\ d_4R_{34}R_{43}\ V\ R)$ The latter pairs are applied in various combinations to RCCO or morphic AND circuits 70, 72, 74 and 76. An RCCO (reduction circuit for checker outputs) is a self-testing circuit and is fully described in U.S. Pat. No. 3,559,167. It functions to reduce several pairs of lines to a single pair of lines which take on the values (0,1) or (1,0). An RCCO circuit may also be termed a morphic AND circuit.

The outputs of RCCO circuits 70, 72, 74 and 76 are respectively applied to exclusive OR circuits 71, 73, 75 and 77 to produce the triggers $A_1$, $A_2$, $A_3$ and $A_4$ for registers $R_1$, $R_2$, $R_3$ and $R_4$. The triggers are applied as reset inputs to the flip-flops of the registers.

The equations for providing the $A_1, \ldots, A_4$ triggers are as follows. In these equations, the symbol "$\oplus$" signifies exclusive OR and the symbol $\Lambda_M$ signifies morphic AND.

$A_1 = \oplus / C_{12}\Lambda_M C_{13}\Lambda_M C_{14}$ $A_2 = \oplus / C_{12}\Lambda_M C_{23}\Lambda_M C_{24}$ $A_3 = \oplus / C_{13}\Lambda_M C_{23}\Lambda_M C_{34}$ $A_4 = \oplus / C_{14}\Lambda_M C_{24}\Lambda_M C_{34}$ The operation of the circuit shown in FIG. 1 is now described for the various modes of operation set forth hereinabove.

1. TMR/S Mode

In this mode, initially all of registers $R_1$, $R_2$, $R_3$, and $R_4$ are in the 1111 state and the flip-flop constituting register $R_5$ is set to the 0 state, these states having been set by the operation of system control stage 10. In this situation, data from sending modules $m_1$, $m_2$, $m_3$ and $m_4$ are threshold voted and sent to all of receiving modules $M_1$, $M_2$, $M_3$ and $M_4$.

The $C_{ij}$ pairs at this juncture have the following equations:

$$C_{12} = (d_1, d_2)$$
$$C_{13} = (d_1, d_3)$$
$$C_{14} = (d_1, d_4)$$
$$C_{23} = (d_2, d_3)$$
$$C_{24} = (d_2, d_{d4})$$
$$C_{34} = (d_3, d_4)$$

As long as no errors occur during operation, all $C_{ij}$'s will be $$\begin{Bmatrix} 00 \\ 11 \end{Bmatrix}$$

and, consequently, all $A_i$'s are equal to 0.

a. First Error

1. Let it be assumed that it is sending module $m_1$ which produces the first error. In this situation, pairs $C_{12}$, $C_{13}$ and $C_{14}$ take on the values $$\begin{Bmatrix} 01 \\ 10 \end{Bmatrix}$$

and $C_{23}$, $C_{24}$, and $C_{34}$ remain at $$\begin{Bmatrix} 00 \\ 11 \end{Bmatrix}$$

At this point trigger $A_1$ goes to 1 and triggers $A_2$, $A_3$ and $A_4$ remain at 0. Consequently, trigger $A_1$ resets the rightmost bit of each register $R_1, \ldots, R_4$ whereby their states all become 1110. Consequently, sending module $m_1$ is disconnected and data from sending modules $m_2$, $m_3$ and $m_4$ are threshold voted and sent to all receiving modules $M_1$, $M_2$, $M_3$ and $M_4$. The TMR operation continues. At this juncture, the $C_{ij}$ pairs are as follows:

$$C_{12} = (1,0)$$
$$C_{13} = (1,0)$$
$$C_{14} = (1,0)$$
$$C_{23} = (d_2, d_3)$$
$$C_{24} = (d_2, d_4)$$
$$C_{34} = (d_3, d_4)$$

Consequently, trigger $A_1$ remains at 1 and triggers $A_2$, $A_3$ and $A_4 = 0$.

2. Let it be assumed now that it is sending module $m_2$ which produces the first error. Therefore, pairs $C_{12}$, $C_{23}$, and $C_{24}$ take on the values $$\begin{Bmatrix} 01 \\ 10 \end{Bmatrix}$$

and the pairs $C_{13}$, $C_{14}$, and $C_{34}$ remain at $$\begin{Bmatrix} 00 \\ 11 \end{Bmatrix}$$

. Trigger $A_2$ takes on the value of 1 and triggers $A_1$, $A_3$ and $A_4$ remain at 0. With the value of 1 for $A_2$, the second rightmost bits of registers $R_1, \ldots, R_4$ are set to 0 and the register states go to 1101. Sending module $m_2$ is thereby disconnected. Data from sending modules $m_1$, $m_3$ and $m_4$ are threshold voted and sent to all receiving modules $M_1, \ldots, M_4$. TMR operation continues. The $C_{ij}$ pairs values are now as follows:

$$C_{12} = (1,0)$$
$$C_{13} = (d_1,d_3)$$
$$C_{14} = (d_1,d_4)$$
$$C_{23} = (1,0)$$
$$C_{24} = (1,0)$$
$$C_{34} = (d_3,d_4)$$

Trigger $A_2$ stays at 1 and triggers $A_1$, $A_3$ and $A_4$ are at 0.

3. Let it be assumed that sending module $m_3$ produces the first error. In this case, trigger $A_3$ goes to 1. Triggers $A_1$, $A_2$ and $A_4$ = 0. Registers $R_1, \ldots, R_4$ to the 1011 stage. Sending module $m_3$ is thereby disconnected. Data from sending modules $m_1$, $m_2$ and $m_4$ are threshold voted and are sent to all receiving modules $M_1, \ldots, M_4$. TMR operation continues.

4. Let it be assumed that it is sending module $m_4$ that produces the first error. In this situation, trigger $A_4$ goes to 1. Triggers $A_1$, $A_2$ and $A_3 = 0$. All registers $R_1, \ldots, R_4$ go to the 0111 state. Thereby, sending module $m_4$ is disconnected. Data from sending module $m_1$, $m_2$, and $m_3$ are threshold voted and sent to all receiving modules $M_1, \ldots, M_4$. TMR operation continues.

b. Second error

This case is explained with the example of $m_2$ being the first sending module in error followed by the erroneous state of sending module $m_3$.

Prior to sending module $m_3$'s becoming erroneous, the condition which was obtained by the erroneous state of sending module $m_2$ was $$C_{12}=C_{23}=C_{24}=\begin{Bmatrix}1, 0\\0, 1\end{Bmatrix}$$

$$C_{13}=C_{14}=C_{34}=\begin{Bmatrix}0, 0\\1, 1\end{Bmatrix}$$

$$A_2=1 \text{ and } A_1=A_3=A_4=0$$

All registers $R_1 \ldots, R_4$ are in the 1101 state. Sending module $m_2$ was disconnected.

Now, the occurrence of the error in sending module $m_3$ causes pairs $C_{13} = C_{34} =$ $$\begin{Bmatrix}1, 0\\0, 1\end{Bmatrix}$$

and pair $C_{14}$ remains at $$\begin{Bmatrix}0, 0\\1, 1\end{Bmatrix}$$

. Consequently, trigger $A_2 = 1$, trigger $A_3 = 1$ and trigger $A_1 = A_4 = 0$. All of registers $R_1, \ldots, R_4$ go to the 1001 state. Consequently, sending module $m_2$ remains disconnected and, in addition, sending module $m_3$ is disconnected. Data from sending modules $m_1$ and $m_4$ are threshold voted and sent to all receiving modules $M_1, \ldots, M_4$. Operation now continues in the comparison mode.

The $C_{ij}$ and $A_i$ values are now as follows:

$$C_{12} = (1,0)$$
$$C_{13} = (1,0)$$
$$C_{14} = (d_1,d_4)$$
$$C_{23} = (1,0)$$
$$C_{24} = (1,0)$$
$$C_{34} = (1,0)$$
$$A_2 = A_3 = 1 \text{ and } A_1 = A_4 = 0$$

If, now, either of sending modules $m_1$ or $m_4$ becomes erroneous, $C_{14}$ goes to $$\begin{Bmatrix}0, 0\\1, 1\end{Bmatrix}$$

. Consequently, $A_1 = A_2 = A_3 = A_4 = 1$ whereby all of registers $R_1, \ldots, R_4$ go to the 0000 state and operation halts. It halts because there is no way of determining which of sending modules $m_1$ or $m_4$ was in error. Therefore, both of the latter modules are disconnected. Further computation depends on software action.

COMPARISON MODE

To enable operation in the "comparison" mode, the following settings have to be put into registers $R_1, \ldots, R_4$. Register $R_5$ remains in the 0 state for all of these settings. These settings are effected by system control stage 10.

| Sending Modules To Be Compared | Register Patterns |
|---|---|
| $m_1$ & $m_2$ | $R_1 = R_2 = 0011$ |
| $m_1$ & $m_3$ | $R_1 = R_3 = 0101$ |
| $m_1$ & $m_4$ | $R_{1\,1} = R_4 = 1001$ |
| $m_2$ & $m_3$ | $R_2 = R_3 = 0110$ |
| $m_2$ & $m_4$ | $R_2 = R_4 = 1010$ |
| $m_3$ & $m_4$ | $R_3 = R_4 = 1100$ |

Thus, for example, if it is desired to have two processes running in the comparison mode such as for example sending modules $m_1$ and $m_3$ in one process, and sending $m_2$ and $m_4$ in the other process, then the settings in the registers will be as follows:

$$R_1 = R_3 = 0101, R_2 = R_4 = 1010$$

In the switching operation whereby sending module $m_1$ and $m_3$, and sending modules $m_2$ and $m_4$ are being respectively compared, the pairs $C_{ij}$ take the following values:

$$C_{12} = (1,0)$$
$$C_{13} = (d_1,d_3)$$
$$C_{14} = (1,0)$$
$$C_{23} = (1,0)$$
$$C_{24} = (d_2,d_4)$$
$$C_{34} = (1,0)$$

$$A_1 = A_3 = (d_1 \oplus d_3) \text{ and } A_2 = A_4 = (d_2 \oplus d_4)$$

In the comparison mode in the example being described, let it be assumed that one of the sending modules $m_1$ or $m_3$ produces an error. Such event causes $A_1 = A_3 = 1$ to cause the first and third bits (counting from the right of each register) of registers $R_1$ and $R_3$ to be set to zero. There thereby results a setting of 0000 for registers $R_1$ and $R_3$. Consequently, both sending modules $m_1$ and $m_3$ are disconnected. The settings in registers $R_2$ and $R_4$ remain unchanged. Operation in the comparison mode continues.

SIMPLEX MODE

In this mode, the bit constituting register $R_5$ is set to 1.

The settings in registers $R_1, \ldots, R_4$ and the resulting respective sending to receiving module connections are as follows:

| Setting in Registers $R_1, \ldots, R_4$ | Resulting Sending To Receiving Module Connections |
|---|---|
| $R_1 = 0001$ | $m_1$ to $M_1$ |
| $R_2 = 0010$ | $m_2$ to $M_2$ |
| $R_3 = 0100$ | $m_3$ to $M_3$ |
| $R_4 = 1000$ | $m_4$ to $M_4$ |

Because register $R_5$ is at 1, triggers $A_1, \ldots, A_4$ are all at 0.

To summarize the foregoing, in the tabulations hereinbelow, there are set forth the various register settings and the value of the $C_{ij}$ pairs in different situations encountered in the several modes of operation of the invention. The check marks, ✓, under $C_{ij}$'s mean that the two lines have the values $d_i, d_j$ and are not forced to constant values. The tabulations are based upon the embodiment shown in FIG. 1.

TMR/S MODE OF OPERATION

| | Register $R_1$ | | | | Register $R_2$ | | | | Register $R_3$ | | | | Register $R_4$ | | | | Register | | | | | | |
|---|---|---|---|---|---|---|---|---|---|---|---|---|---|---|---|---|---|---|---|---|---|---|---|
| | $R_{14}$ | $R_{13}$ | $R_{12}$ | $R_{11}$ | $R_{24}$ | $R_{23}$ | $R_{22}$ | $R_{21}$ | $R_{34}$ | $R_{33}$ | $R_{32}$ | $R_{31}$ | $R_{44}$ | $R_{43}$ | $R_{42}$ | $R_{41}$ | $R_5$ | $C_{12}$ | $C_{13}$ | $C_{14}$ | $C_{23}$ | $C_{24}$ | $C_{34}$ |
| 1 | 1 | 1 | 1 | 1 | 1 | 1 | 1 | 1 | 1 | 1 | 1 | 1 | 1 | 1 | 1 | 1 | 0 | ✓ | ✓ | ✓ | ✓ | ✓ | ✓ |
| 2 | 1 | 1 | 1 | 0 | 1 | 1 | 1 | 0 | 1 | 1 | 1 | 0 | 1 | 1 | 1 | 0 | 0 | 10 | 10 | 10 | ✓ | ✓ | ✓ |
| 3 | 1 | 1 | 0 | 1 | 1 | 1 | 0 | 1 | 1 | 1 | 0 | 1 | 1 | 1 | 0 | 1 | 0 | 10 | ✓ | ✓ | 10 | 10 | ✓ |
| 4 | 1 | 0 | 1 | 1 | 1 | 0 | 1 | 1 | 1 | 0 | 1 | 1 | 1 | 0 | 1 | 1 | 0 | ✓ | 10 | ✓ | 10 | ✓ | 10 |
| 5 | 0 | 1 | 1 | 1 | 0 | 1 | 1 | 1 | 0 | 1 | 1 | 1 | 0 | 1 | 1 | 1 | 0 | ✓ | ✓ | 10 | ✓ | 10 | 10 |

wherein the line designations for the register settings and the values of the $C_{ij}$ pairs correspond.

In the TMR/S mode of operation, all four replicas of $M_i$ are connected.

| Simplex mode of operation | | | No. checking | All Ai triggers=0 |
|---|---|---|---|---|
| R | 0001 | ⟶ $m_1$ to $M_1$ | | |
| R | 0010 | ⟶ $m_2$ to $M_1$ | | |
| R | 0100 | ⟶ $m_3$ to $M_1$ | | |
| R | 1000 | ⟶ $m_4$ to $M_1$ | | |

*Comparison mode of operations:*

(a) Comparison of two input modules feeding into all output modules (This situation arises for example when the comparison mode is entered into from the TMR mode). In this case, all registers contain exactly the same two bits on. The checks show the input modules being compared.

| | Register $R_1$ | | | | Register $R_2$ | | | | Register $R_3$ | | | | Register $R_4$ | | | | Register | | | | | | |
|---|---|---|---|---|---|---|---|---|---|---|---|---|---|---|---|---|---|---|---|---|---|---|---|
| | $R_{14}$ | $R_{13}$ | $R_{12}$ | $R_{11}$ | $R_{24}$ | $R_{23}$ | $R_{22}$ | $R_{21}$ | $R_{34}$ | $R_{33}$ | $R_{32}$ | $R_{31}$ | $R_{44}$ | $R_{43}$ | $R_{42}$ | $R_{41}$ | $R_5$ | $C_{12}$ | $C_{13}$ | $C_{23}$ | $C_{23}$ | $C_{24}$ | $C_{34}$ |
| 1 | 0 | 0 | 1 | 1 | 0 | 0 | 1 | 1 | 0 | 0 | 1 | 1 | 0 | 0 | 0 | 1 | 0 | ✓ | 10 | 10 | 10 | 10 | 10 |
| 2 | 0 | 1 | 0 | 1 | 0 | 1 | 0 | 1 | 0 | 1 | 0 | 1 | 0 | 1 | 0 | 1 | 0 | 10 | ✓ | 10 | 10 | 10 | 10 |
| 3 | 1 | 0 | 0 | 1 | 1 | 0 | 0 | 1 | 1 | 0 | 0 | 1 | 1 | 0 | 0 | 1 | 0 | 10 | 10 | ✓ | 10 | 10 | 10 |
| 4 | 0 | 1 | 1 | 0 | 0 | 1 | 1 | 0 | 0 | 1 | 1 | 0 | 0 | 1 | 1 | 0 | 0 | 10 | 10 | 10 | ✓ | 10 | 10 |
| 5 | 1 | 0 | 1 | 0 | 1 | 0 | 1 | 0 | 1 | 0 | 1 | 0 | 1 | 0 | 1 | 0 | 0 | 10 | 10 | 10 | 10 | ✓ | 10 |
| 6 | 1 | 1 | 0 | 0 | 1 | 1 | 0 | 0 | 1 | 1 | 0 | 0 | 1 | 1 | 0 | 0 | 0 | 10 | 10 | 10 | 10 | 10 | ✓ |

Wherein the numerical line designations for the register settings and the values of the $C_{ij}$ pairs correspond.

MIXED MODE

Let the registers be of length $n$ in order to achieve interconnections between $n$ sending and $n$ receiving machines. Let the bits in $R_i$ be denoted as $$R_{in}, R_{in-1}, \ldots, R_{il}$$

Bit $R_{ij}$ in register $R_i$ when equal to 1 connects sending module $m_j$ to receiving module $M_i$ through the threshold voter. If $R_{ij}$ is equal to 0, then $m_j$ is not connected to $M_i$.

If $j_1, j_2, j_3$ are used to determine bits in registers chosen by $i_1, i_2, i_3$ (e.g., $R_{i_1j_1}$, $R_{i_1j_2}$, $R_{i_1j_3}$, $R_{i_2j_1}$, $R_{i_2j_2}$, $R_{i_2j_3}$, $R_{i_3j_1}$, $R_{i_3i_2}$, $R_{i_3j_3}$ are all 1 and the other bits in the registers are zero) then $m_{j_1}$, $m_{j_2}$, $m_{j_3}$ are connected to $M_{i_1}$, $M_{i_2}$, $M_{i_3}$ and the forcing functions and threshold functions automatically perform TMR (triple modular redundancy).

If $j_1, j_2$ are used with $i_1$, $i_2$ to determine bits in registers $R_{i_1}$, $R_{i_2}$ (e.g., $R_{j_1j}$, $R_{j_1j_2}$, $R_{i_2j_1}$, $R_{i_2j_2}$ are 1, the other bits 0), then the forcing functions and threshold functions automatically perform comparison of $m_{j1}$ and $m_{j2}$ with outputs $M_{i1}$ and $M_{i_2}$.

TMR/S is performed with automatic switching if 4 (or more) bits are chosen in 4 (or more) registers.

The combinations are obvious to one skilled in the art, and the following example shows an illustrative case.

Operation in the mixed mode can be better explained by the properties of an interface that connects 6 input modules to 6 output modules. Here, there are required 6 registers $R_1$, $R_2$, $R_3$, $R_4$, $R_5$ and $R_6$, each of 6 bit length and a one-bit register $R_7$. The table shows the contents of the control register in order to operate in the TMR/S and Comparison modes.

| $R_1$ | $R_2$ | $R_3$ | $R_4$ | Connection |
|---|---|---|---|---|
| 001111 | 001111 | 001111 | 001111 | $m_1, m_2, m_3, m_4 \longrightarrow M_1, M_2, M_3, M_4$ |
| $R_5$ | $R_6$ | $R_7$ | | |
| 110000 | 110000 | 0 | | $m_5, m_6 \longrightarrow M_5, M_6$ |

While the invention has been particularly shown and described with reference to a preferred embodiment thereof, it will be understood by those skilled in the art that the foregoing and other changes in form and details may be made therein without departing from the spirit and scope of the invention.

(b) Comparison of two inputs feeding into two output modules. The last column shows the module connections. e.g., $m_{i,j} \longrightarrow M_{i,j}$ means $m_i$ and $m_j$ are compared and connected to $M_i$ and $M_j$.

| | Register R1 | | | | Register R2 | | | | Register R3 | | | | Register R4 | | | | | | | | | | | |
|---|---|---|---|---|---|---|---|---|---|---|---|---|---|---|---|---|---|---|---|---|---|---|---|---|
| | $R_{14}$ | $R_{13}$ | $R_{12}$ | $R_{11}$ | $R_{24}$ | $R_{23}$ | $R_{22}$ | $R_{21}$ | $R_{34}$ | $R_{33}$ | $R_{32}$ | $R_{31}$ | $R_{44}$ | $R_{43}$ | $R_{42}$ | $R_{41}$ | $m_{i,j} \longrightarrow M_{i,j}$ | $C_{12}$ | $C_{13}$ | $C_{14}$ | $C_{23}$ | $C_{24}$ | $C_{34}$ | $m_{i,j} \longrightarrow M_{i,j}$ |
| 1 | 0 | 0 | 1 | 1 | 0 | 0 | 1 | 1 | 1 | 1 | 0 | 0 | 1 | 1 | 0 | 0 | $m_{1\cdot2} \longrightarrow M_{1\cdot2}$; $m_{3\cdot4} \longrightarrow M_{3\cdot4}$ | V | 10 | 10 | 10 | 10 | V | $m_{1\cdot2} \longrightarrow M_{1\cdot2}$; $m_{3\cdot4} \longrightarrow M_{3\cdot4}$ |
| 2 | 0 | 1 | 0 | 1 | 1 | 0 | 1 | 0 | 0 | 1 | 0 | 1 | 1 | 0 | 1 | 0 | $m_{1\cdot3} \longrightarrow M_{1\cdot3}$; $m_{2\cdot4} \longrightarrow M_{2\cdot4}$ | 10 | V | 10 | 10 | V | 10 | $m_{1\cdot3} \longrightarrow M_{1\cdot3}$; $m_{2\cdot4} \longrightarrow M_{2\cdot4}$ |
| 3 | 1 | 0 | 0 | 1 | 0 | 1 | 1 | 0 | 0 | 1 | 1 | 0 | 1 | 0 | 0 | 1 | $m_{1\cdot4} \longrightarrow M_{1\cdot4}$; $m_{2\cdot3} \longrightarrow M_{2\cdot3}$ | 10 | 10 | V | V | 10 | 10 | $m_{1\cdot4} \longrightarrow M_{1\cdot4}$; $m_{2\cdot3} \longrightarrow M_{2\cdot3}$ |

Wherein the numerical designations for the register settings and the ($C_{ij}$) values correspond.

In this case where module $m_1$ is erroneous, we can operate as follows:

| | Register R1 | | | | Register R2 | | | | Register R3 | | | | Register R4 | | | | | | | | | | | | |
|---|---|---|---|---|---|---|---|---|---|---|---|---|---|---|---|---|---|---|---|---|---|---|---|---|---|
| | $R_{14}$ | $R_{13}$ | $R_{12}$ | $R_{11}$ | $R_{24}$ | $R_{23}$ | $R_{22}$ | $R_{21}$ | $R_{34}$ | $R_{33}$ | $R_{32}$ | $R_{31}$ | $R_{44}$ | $R_{43}$ | $R_{42}$ | $R_{41}$ | Connection | $C_{12}$ | $C_{13}$ | $C_{14}$ | $C_{23}$ | $C_{24}$ | $C_{25}$ | $m_{i,j} \longrightarrow M_{i,j}$ | |
| 1 | 0 | 0 | 0 | 0 | 0 | 0 | 0 | 0 | 1 | 1 | 0 | 0 | 1 | 1 | 0 | 0 | $m_{3\cdot4} \longrightarrow M_{3\cdot4}$ | 10 | 10 | 10 | 10 | 10 | V | $m_{3\cdot4} \longrightarrow M_{3\cdot4}$ | Comparison. |
| 2 | 0 | 0 | 0 | 0 | 0 | 1 | 1 | 0 | 0 | 1 | 1 | 0 | 0 | 0 | 0 | 0 | $m_{2\cdot3} \longrightarrow M_{2\cdot3}$ | 10 | 10 | 10 | V | 10 | 10 | $m_{2\cdot3} \longrightarrow M_{2\cdot3}$ | Do. |
| 3 | 0 | 0 | 0 | 0 | 1 | 0 | 1 | 0 | 0 | 0 | 0 | 0 | 1 | 0 | 1 | 0 | $m_{2\cdot4} \longrightarrow M_{2\cdot4}$ | 10 | 10 | 10 | 10 | V | 10 | $m_{2\cdot4} \longrightarrow M_{2\cdot4}$ | Do. |

Wherein the numerical designations of lines correspond for the registers and the $C_{ij}$ pairs.

What is claimed is:

1. An interface for controlling the interconnections between $m_1, \ldots, m_n$ identical sending modules and $M_1, \ldots, M_n$ identical receiving modules comprising:

$1, \ldots, n$ control registers, each of said registers comprising $n$ bits, wherein $R_{ij}$ is a register bit;

means for setting each of said bits to initial binary states;

$d_1, \ldots, d_n$ outputs from said sending modules, respectively;

means for providing $n^2$ forcing functions, each of said functions being a circuit represented by the following logical equation:

$$f_{ji} = d_j R_{ij} V \overline{R}_{ij} \overline{R}_{i|j+1|_n} \ldots \overline{R}_{i|j+n-2|_n}$$

wherein $j$ is the bit number of a register and takes the value of $1, \ldots, n$, $i$ is the register number and takes the value $1, \ldots, n$, the symbol $|\ |_n$ signifies modulo $n$ and the symbol V represents the OR function;

$1, \ldots, n$ threshold function circuits which respectively produce a "1" output when $\geq 2$ inputs thereto are "1";

means for applying said $n^2$ forcing functions in sets of $n$ to said $(1, \ldots, n)^{th}$ threshold circuits respectively; and means for applying the outputs of said $(1, \ldots, n)^{th}$ threshold circuits to said $(M_1, \ldots, M_n)^{th}$ receiving modules, respectively. wherein $C_{ij}$ is a self-testing pair and the $ij$ pair takes the values of 12, 13, 14, $\ldots$, $1n$, 2, 3, 24, $\ldots$, $2n$, $\ldots$, $(n-1)n$;

means for generating register triggers which are represented by the following equations:

$A_1 = \oplus / C_{12} \Lambda_M C_{13} \Lambda_M C_{14} \Lambda_M \Lambda_M C_{1n}$ $A_2 = \oplus / C_{21} \Lambda_M C_{23} \Lambda_M C_{24} \Lambda_M \ldots \Lambda_M C_{2n}$

.

.

$A_n = \oplus / C_{1n} \Lambda_M C_{2n} \Lambda_M C_{3n} \Lambda_M \ldots \Lambda_M C_{(n-1),\ n}$ the symbol $\Lambda_M$ represents the morphic AND function, wherein the symbol $\oplus$ signifies the exclusive OR function on the two outputs of the $\Lambda_M$ and $A_1, \ldots, A_n$ are said register triggers; and means for applying said $(A_1, \ldots, A_n)^{th}$ triggers to the $(1, \ldots, n)^{th}$ bits of said registers respectively to switch said bits to the opposites of their initial binary states whereby, upon the generation of a register trigger $A_j$ and the consequent switching of the register bits $R_{ij}, \ldots, R_{nj}$ to said opposite binary states, sending module $m_j$ is disconnected.

2. An interface for controlling the interconnections between $m_1, \ldots, m_n$ identical sending modules and $M_1, \ldots, M_n$ identical receiving modules comprising:

1, . . . , n control registers, each of said registers comprising $n$ bits, wherein $R_{in}$ is a register bit;

means for setting each of said bits to initial binary states;

$d_1, \ldots, d_n$ outputs from said sending modules, respectively;

means for providing $n^2$ forcing functions, each of said functions being a circuit represented by the following logical equation:

$$f_{ji} = d_j R_{ij} V \overline{R}_{ij} \overline{R}_{i|j+1|_n} \ldots \overline{R}_{i|j+n-2|_n}$$

wherein $j$ is the bit number of a register and takes the value of $1, \ldots, n$, $i$ is the register number and takes the value $1, \ldots, n$, the symbol $|\ |_n$ signifies modulo $n$ and the symbol V represents the OR function, $1, \ldots, n$ threshold function circuits which respectively produce a "1" output when $\geq 2$ inputs thereto are "1";

means for applying said $n^2$ forcing functions in sets of $n$ to said $(1, \ldots, n)^{th}$ threshold circuits respectively;

means for applying the outputs of said $(1, \ldots, n)^{th}$ threshold circuits to said $(M_1, \ldots, M_n)^{th}$ receiving modules, respectively;

means for generating pairs which are represented by the following logical equation:

$$C_{ij} = (d_i\ V\ \overline{R_{ij}}\ V\ \overline{R_{ji}},\ d_j R_{ij} R_{ji})$$

3. An interface for controlling the interconnections between $m_1, \ldots, m_n$ identical sending modules and $M_1, \ldots, M_n$ identical receiving modules comprising:

$1, \ldots, n$ control registers, each of said registers comprising $n$ bits, wherein $R_{ij}$ is a register bit;

an $(n+1)^{th}$ control register comprising a single bit $R_S$, means for initially setting each of said bits to initial binary states;

$d_1, \ldots, d_n$ outputs from said sending modules, respectively;

means for providing $n^2$ forcing functions, each of said forcing functions being a circuit represented by the following logical equation:

$$f_{ji} = d_j R_{ij} V \overline{R}_{ij} \overline{R}_{i|j+1|_n} \ldots \overline{R}_{i|j+n-2|_n}$$

wherein $j$ is the bit number of a bit in control register $1, \ldots, n$, and takes the value of $1, \ldots, n$, $i$ is the control register number and takes the value of $1, \ldots, n$, the symbol $|\ |_n$ signifies modulo $n$ and the symbol V represents the OR function;

$1, \ldots, n$ threshold circuits which respectively produce a "1" output when $\geq 2$ inputs thereto are "1";

means for applying said $n^2$ forcing functions in sets of $n$ to said $(1, \ldots, n)^{th}$ threshold circuits respectively;

means for applying the outputs of said $(1, \ldots, n)^{th}$ threshold circuits to said $(M_1, \ldots, M_n)$ the receiving modules respectively;

means for generating self-testing pairs which are represented by the following logical equation:

$C_{ij} = (d_i\ V\ \overline{R_{ij}}\ V\ \overline{R_{ji}}\ V\ R_S,\ d_j R_{ij} R_{ji}\ V\ R_S)$ for $j = i+1$ and $i = 1,3,5, \ldots n-1$ and $C_{ij} = (d_i\ V\ \overline{R_{ij}}\ V\ \overline{R_{ji}},\ d_j R_{ij} R_{ji})$ wherein $C_{ij}$ is said pair and the $ij$ pair takes one of the values of 13, 14, ..., $1n$, 24, ..., $2n$, ..., $(n-2)n$;

means for generating register triggers which are represented by the following equations:

$A = \oplus / C_{12} \Lambda_M C_{13} \Lambda_M C_{14} \Lambda_M \ldots \Lambda_M C_{1n}$ $A = \oplus / C_{21} \Lambda_M C_{23} \Lambda_M C_{24} \Lambda_M \ldots \Lambda_M C_{2n}$ $\vdots$ $A_n = \oplus / C_{1n} \Lambda_M C_{2n} \Lambda_M C_{3n} \Lambda_M \ldots \Lambda_M C_{(n-1)n}$ the symbol $\Lambda_M$ represents the morphic AND function wherein the symbol $\oplus$ signifies the exclusive OR function, on the two outputs of the $\Lambda_M$ and $A_1, \ldots, A_n$ are said register triggers; and means for applying said $(A_1, \ldots, A_n)^{th}$ triggers to the $(1, \ldots, n)^{th}$ bits of said $(1, \ldots, n)^{th}$ registers, respectively to switch said bits to the opposites of their initial binary states whereby upon the generation of a register trigger $A_j$ and the consequent switching of register bits $R_{ij}, \ldots, R_{nj}$ to said opposite binary states, sending module $m_j$ disconnected.

4. An interface as defined in claim 3 wherein said interface is rendered operative in the TMR/S (triple modular redundancy with sparing) mode of operation in response to the setting, by said initial states setting means of all of the bits in said $n$ registers to said 1 state and the setting of the bit of said $(n+1)^{th}$ register to said 0 state, the occurrence of $(n-2)$ failures in said sending modules causing said interface to operate in the comparison mode of operation.

5. An interface as defined in claim 3 wherein said interface is rendered operative in the comparison mode of operation, i.e., the comparing of sending modules $m_h$ and $m_k$ of said $1, \ldots, n$ sending modules connected to $M_h$ and $M_k$ in response to the setting by said initial states setting means of bits $h$ and $k$ of said registers $R_h$ and $R_{ks}$ to said 1 state and the remaining bits of said $(1, \ldots, n)^{th}$ registers to said 0 state, and the setting of the bit in said $(n+1)^{th}$ register to the 0 state.

6. An interface as defined in claim 3 wherein said interface is rendered operative in the simplex mode of operation by the setting to the 1 state of the respective bit in each of $(1, \ldots, n)^{th}$ registers having the number of its register, the setting of all of the other bits of said $(1, \ldots, n)^{th}$ registers to the 0 state, and by the setting of said $(n+1)^{th}$ register to the 1 state.

7. An interface as defined in claim 3 wherein said interface is operative in the mixed mode of operation, wherein said mixed mode takes the following form:

said $n$ sending modules are partitioned into sets of $pg$ groups of $q$ modules wherein $pg$ is an arbitrarily chosen integer denoting the quantity of groups with $q$ modules operative, said value of $pg$ being chosen to satisfy the following equation:

$$\sum_{q=2}^{M} qpq = n$$

wherein $pq$ can take the value of 0, whereby there are provided $p_2$ groups of modules being operated in the comparison mode, $p_3$ groups of modules being operated in the type modular redundancy mode, and for any value of $q \geq 4$, pq groups of modules being operated in the triple modular redundancy mode with $q$-3 spares, wherein the values of $pq$ are determined by the above equation, said $n$ registers being set as follows by said bits setting means;

a $q$ quantity of bits in each of said registers associated with each $pq$ group of modules, at identical bit positions in said last-named registers and set to 1, the sets of bits for each of said $pq$ group associated registers being disjoint relative to each other, said $R_S$ bit being initially set to 0.

* * * * *